US 9,148,781 B2

(12) United States Patent
Le Sage (10) Patent No.: US 9,148,781 B2
(45) Date of Patent: Sep. 29, 2015

(54) WIRELESS TRANSMISSION OF DATA PACKETS BASED ON CLIENT ASSOCIATIONS

(75) Inventor: Jocelyn Le Sage, St. Laurent (CA)

(73) Assignee: Hewlett-Packard Development Company, L.P., Houston, TX (US)

( * ) Notice: Subject to any disclaimer, the term of this patent is extended or adjusted under 35 U.S.C. 154(b) by 431 days.

(21) Appl. No.: 13/192,681

(22) Filed: Jul. 28, 2011

(65) Prior Publication Data

US 2013/0028176 A1  Jan. 31, 2013

(51) Int. Cl.
*H04L 12/28* (2006.01)
*H04W 12/02* (2009.01)
*H04J 1/16* (2006.01)
*H04L 12/46* (2006.01)
*H04W 12/06* (2009.01)
*H04W 84/12* (2009.01)

(52) U.S. Cl.
CPC ........... *H04W 12/02* (2013.01); *H04L 12/4641* (2013.01); *H04W 12/06* (2013.01); *H04W 84/12* (2013.01)

(58) Field of Classification Search
CPC .................................................. H04L 12/4641
USPC .................. 370/252, 328, 389, 401
See application file for complete search history.

(56) References Cited

U.S. PATENT DOCUMENTS

| 7,339,915 | B2 * | 3/2008 | Jakkahalli et al. ............. 370/338 |
| 7,350,077 | B2 * | 3/2008 | Meier et al. ................... 713/171 |
| 7,761,923 | B2 | 7/2010 | Khuti et al. |
| 7,849,217 | B2 | 12/2010 | Meier |
| 7,877,080 | B2 | 1/2011 | Volpano |
| 7,936,670 | B2 * | 5/2011 | Cazares et al. ................ 370/230 |
| 2006/0153122 | A1 * | 7/2006 | Hinman et al. ............... 370/328 |
| 2006/0165103 | A1 * | 7/2006 | Trudeau et al. ............... 370/401 |
| 2007/0030824 | A1 * | 2/2007 | Ribaudo et al. .............. 370/328 |
| 2008/0020758 | A1 * | 1/2008 | Nagarajan et al. ............ 455/433 |
| 2009/0109946 | A1 * | 4/2009 | Morton et al. ................ 370/338 |
| 2009/0129386 | A1 * | 5/2009 | Rune ............................ 370/392 |

FOREIGN PATENT DOCUMENTS

EP  1061694  12/2000

* cited by examiner

*Primary Examiner* — John Pezzlo
(74) *Attorney, Agent, or Firm* — Hewlett-Packard Patent Department (57) ABSTRACT

Techniques are provided for wireless transmission of data packets based on client associations. A data packet may be received at a wireless access point. It may be determined if at least one client associated with the wireless access point should receive the data packet. The data packet may be wirelessly transmitted if it is determined that there is a client that is associated with the wireless access point that should receive the data packet.

12 Claims, 6 Drawing Sheets

WIRELESS TRANSMISSION OF DATA PACKETS BASED ON CLIENT ASSOCIATIONS

BACKGROUND

A Virtual Local Area Network (VLAN) may be used to segment a physical Local Area Network (LAN) into what appears to be several different local area networks. For example, in a wired switch, each port may be assigned to a VLAN. A data packet may be intended for broadcast to all clients on a given VLAN. The switch may receive the data packet and transmit the data packet on all ports that have been assigned to the given VLAN. The data packet may not be transmitted on ports that are not assigned to the VLAN. Thus, the data packet may only be received by clients that are physically connected to ports of the switch that have been assigned to the VLAN.

DETAILED DESCRIPTION

Wireless networks are becoming increasingly prevalent in today's network topologies. However, a problem arises in that the concepts of a VLAN do not typically extend very well to wireless networks. For example, in order to implement a wireless network, a wireless access point may be added to the network. The wireless access point may broadcast a Service Set Identifier (SSID) which may identify the network associated with the wireless access point. Clients wishing to wirelessly connect to the network may connect to the wireless access point on the SSID.

However, unlike a wired network in which a single client is connected to a single port of a switch, all clients connected to an SSID appear as if they were connected to the same network segment. Thus, it is not possible to simply transmit a data packet associated with a VLAN only on ports associated with the VLAN as is done with a wired network, because all clients of an SSID appear as if they were on the same port. If a data packet is broadcast, it may be received by all clients, regardless of if the client is a member of the VLAN. Further exacerbating the problem is that wireless access points may broadcast more than one SSID. Thus, the wireless access point may have multiple clients that are connected to multiple SSIDs. To ensure that a data packet associated with a VLAN is sent to all clients associated with that VLAN, the wireless access point may need to transmit the data packet to all clients, on all SSIDs to ensure that the data packet may be received by clients associated with the VLAN. The broadcast of the data packets on all SSIDs may cause problems such as increased RF interference and wasted wireless bandwidth. In addition, the broadcast of the data packets on all SSIDs may raise security concerns because clients that are not associated with the VLAN may receive the data packets. These data packets may reveal information about the network, which in and of itself is a security concern.

In addition to the problems described above, there is a further problem that in many cases there may be no clients associated with the wireless access point that need the data packet. For example, a data packet may be associated with a VLAN. To ensure that the data packet is received by all clients associated with that VLAN, the data packet may need to be transmitted on all SSIDs associated with the VLAN. However, if there is no client associated with the VLAN currently connected to the wireless access point, all transmissions of the data packet would have been unnecessary, as there is no client that would need the data packet.

The techniques described herein overcome the problems described above by intelligently determining when a data packet should be wirelessly transmitted. The wireless access point may maintain a mapping of clients, SSIDs, and VLANs. When a data packet associated with a VLAN is received, the wireless access point may determine if there is at least one client associated with the wireless access point that should receive the data packet. If no such client is found, the data packet may be discarded. Furthermore, if a client is found that should receive the data packet, the wireless access point may further determine which SSID that client is connected to. The data packet may be transmitted on SSIDs that contain at least one client that should receive the data packet.

Figure 1:
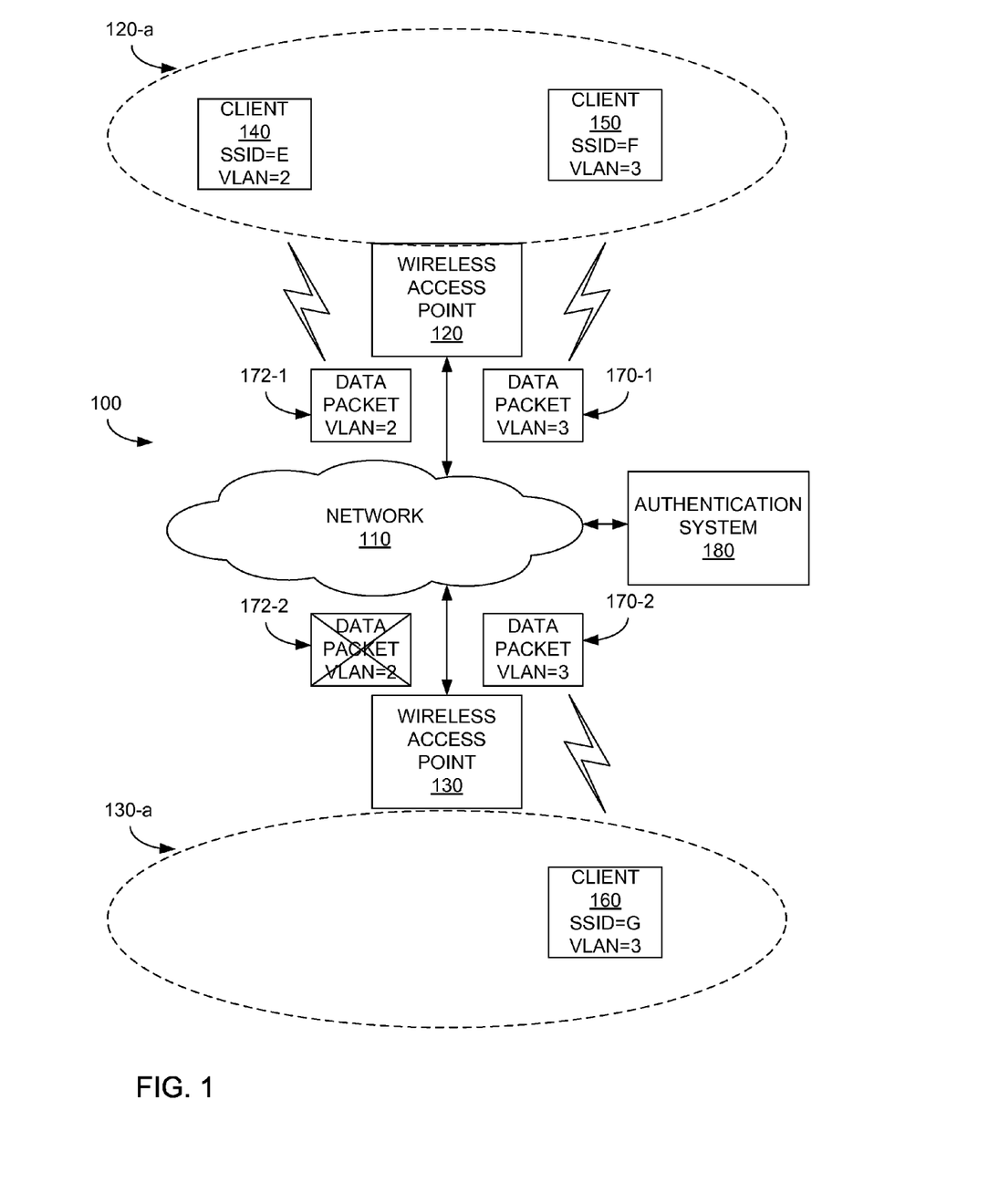
FIG. 1 depicts a high level block diagram of an example system implementing techniques described herein.

FIG. 1 depicts a high level block diagram of an example system implementing techniques described herein. System 100 may include network 110, wireless access point 120, and wireless access point 130. The network may be a local area network, through which client computers may communicate. The network 110 may further be connected to a wide area network (not shown). Wireless access points 120 and 130 may allow client computers to wirelessly connect to the network.

Wireless access point 120 may provide wireless coverage to a defined area, such as coverage area 120-a. Similarly, wireless access point 130 may provide coverage in a different area, such as coverage area 130-a. Typically, the coverage areas of wireless access points may not substantially overlap. For example, in a building with two stories, there may be a wireless access point that provides wireless coverage to each floor of the building. Although only two wireless access points are depicted, it should be understood that any number of wireless access points are possible.

Each wireless access point may broadcast one or more SSIDs. As explained above, an SSID may generally be thought of as a separate network. A client computer may typically connect to a wireless access point on a single SSID. Furthermore, the network may be segmented into one or more VLANs. As described above, a VLAN may be used to allow a single physical network to be divided such that it appears that there are multiple networks, while at the same time using only a single set of hardware resources. For purposes of this description, SSIDs may be identified by a letter (e.g. SSID letter F) and VLANs may be identified by a number (e.g. VLAN number 2). However, it should be understood that these identifications are for clarity of description only. The identifiers could be any type of numeric or character string identifier.

The system 100 may include client computers 140, 150, and 160. The system may also include additional client computers (not shown) connected to the network. The additional client computers may connect to the network in a wired or wireless fashion. Throughout this description, references to a client or client computer are not limited to any specific type of device. For example, clients may include cell phones, MP3 players, gaming consoles, or any other electronic devices. Clients as used herein should be understood to mean any type of device that may connect to a wireless access point. Each client may connect to a SSID of an access point. In addition, each client may be assigned to a VLAN. As shown, client 140 may be connected to the network 110 through wireless access point 120, because the client is located within the coverage area of wireless access point 120. The client 140 may have connected to SSID letter E, as shown. In addition, the client may have been assigned to VLAN number 2. Client 150 may also be connected to wireless access point 120. As shown, client 150 may be connected to SSID letter F and may have been assigned to VLAN number 3. Client 160 may be connected to wireless access point 130 on SSID letter E. Client 160 may have been assigned to VLAN number 3.

In some example implementations, the assignment of a VLAN to a client may be based on the SSID the clients connect to. In other words, all clients connected to the same SSID may be assigned to the same VLAN. In other example implementations, when a client attempts to connect to a wireless access point, the client may provide authentication credentials. The wireless access point may authenticate the client with an authentication system 180. Some examples of authentication systems may include RADIUS servers, Active Directory Servers, or Access controllers. The specific authentication system used is generally unimportant as long as the system is able to return a response to the wireless access point that may include the VLAN to which the client should be assigned. Assigning a client to a VLAN will be described in further detail below.

Data packets that need to be transmitted to clients may be received by the network. The data packets may be generated by clients that are on the network 110 or may come from clients that are external to the network. Regardless of the source, the data packets may need to be transmitted to clients. Each data packet may be associated with a VLAN. Data packets that are associated with a VLAN may be sent to clients on the same VLAN, but should not be sent to clients that are on a different VLAN. Furthermore, if there are no clients associated with a wireless access point that are also associated with the VLAN, there is no need for the wireless access point to transmit the data packet, as there is no client to receive the data packet.

As shown, the network may have received data packets 170-1,2 and 172-1,2. Data packet 170 may be associated with VLAN number 3, while data packet 172 may be associated with VLAN number 2. The data packet may then be sent to the wireless access points 120 and 130 for possible wireless transmission to the clients. Each wireless access point may determine if a data packet is transmitted based on the clients that are currently associated with that access point. For example, data packet 170-1 is associated with VLAN number 3. Wireless access point 120 is aware that client 150 is associated with VLAN number 3. Furthermore, wireless access point 120 is aware that client 150 is connected to SSID letter F. As such, the wireless access point 120 may transmit data packet 170-1 on SSID letter F, because there is at least one client 150 that should receive the data packet.

Similarly, wireless access point 120 may receive data packet 172-1 which is associated with VLAN number 2. Just as above, the wireless access point 120 may be aware that client 140 is assigned to VLAN number 2, and thus should receive the data packet. Furthermore, the client 140 is connected to SSID letter E and as such, the data packet should be transmitted on SSID letter E. It should be noted that data packet 170-1 is not sent on SSID letter E, because no clients associated with VLAN number 3 are connected to SSID letter E. Likewise, data packet 172-1 is not sent on SSID letter F, because there are no clients associated with VLAN number 2 that are connected to SSID letter F.

Data packet 170-2 and 172-2 may also be sent to wireless access point 130. As shown, there is only one client, client 160 associated with wireless access point 130. The client 160 is connected to SSID letter G and is associated with VLAN number 3. As such, data packet 170-2 may be transmitted on SSID letter G because there is at least one client that should receive the data packet. As above, the data packet may only be sent on SSID letter G, because that is the only SSID shown that contains a client that is assigned to VLAN number 3. Data packet 172-2 is associated with VLAN number 2. As shown, there are no clients associated with VLAN number 2 that are connected to wireless access point 130. As such, wireless access point 130 may not transmit the data packet 172-2, because there are no clients that would ever receive that data packet. The techniques used by a wireless access point to determine when and on which SSIDs a data packet will be transmitted will be described in further detail below.

Figure 2:
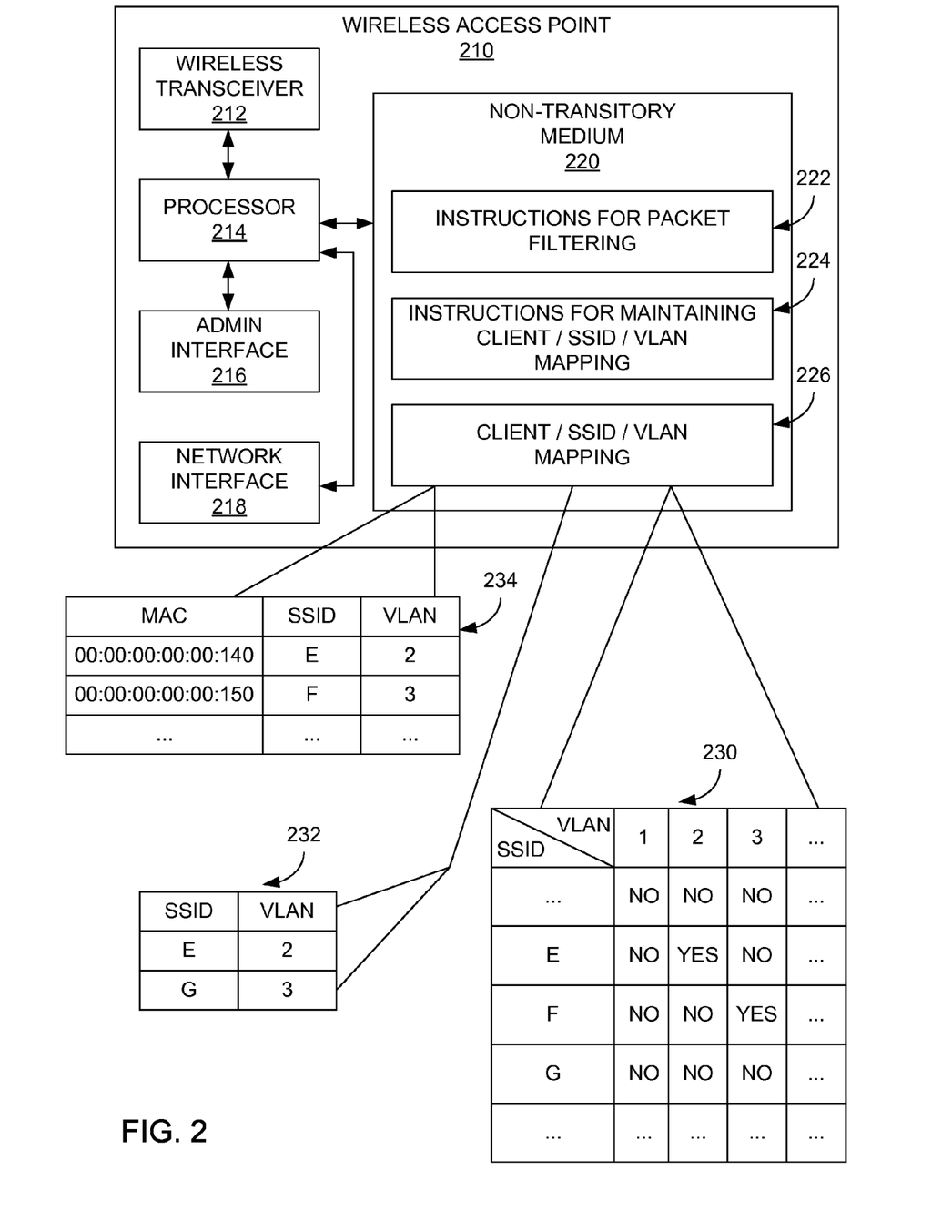
FIG. 2 depicts a high level block diagram of an example of a wireless access point.

FIG. 2 depicts a high level block diagram of an example of a wireless access point. Wireless access point 210 may represent a more detailed description of wireless access point 120 shown in FIG. 1. Wireless access point 210 may contain a wireless transceiver 212, a processor 214, an admin interface 216, and a network interface 218. Wireless access point 210 may also include a non-transitory processor readable medium 220 that stores thereon instructions, which if executed by the processor, cause the processor to execute the techniques that are described herein.

The wireless transceiver 212 may be used to wirelessly send and receive data packets to/from clients that are within the coverage area of the wireless access point. The wireless transceiver may be able to transmit data packets on any SSID that is associated with the wireless access point. Wireless access point 210 may also include a network interface 218. The network interface may be used to send and receive data packets to/from the network 110. For example, data packets may be received from the network through the network interface and then sent wirelessly to the clients through the wireless transceiver.

Wireless access point 210 may also include an admin interface 216 to allow a network administrator to configure the wireless access point. Use of the admin interface will be described in further detail below with respect to receiving a SSID to VLAN mapping. Wireless access point 210 may also include a processor 214. The processor may execute instructions that are stored in non-transitory processor readable medium 220. The medium 220 may contain instructions for packet filtering 222. These instructions may cause the processor to receive a data packet from the network interface and examine the SSID/VLAN occupancy table 230 to determine which SSIDs are associated with a client that is assigned to the VLAN associated with the data packet.

Population of the SSID/VLAN occupancy table will be described in further detail below. For purposes of this portion of the description, a 'YES' value at the intersection of an SSID and a VLAN indicates that there is at least one client connected to the SSID and assigned to the VLAN. Likewise, a 'NO' indicates that there are no clients connected to the SSID that are assigned to the VLAN. The processor may then use the wireless transceiver to wirelessly transmit the data packet on those SSIDs that are determined to have at least one client that is assigned to the VLAN contained in the data packet.

For example, the wireless access point may receive a data packet that is associated with VLAN number 2. By examining the SSID/VLAN occupancy table 230, the processor may be able to determine that for VLAN number 2, there is at least one client that is connected to SSID letter E. As such, the processor may use the wireless transceiver to wirelessly transmit the data packet on SSID letter E, but may not transmit the data packet on any other SSID. Similarly, if a data packet associated with VLAN number 3 is received, the processor may determine that only SSID letter F contains at least one client assigned to VLAN number 3. It should be understood that although not shown, clients associated with different VLANs may all be connected to a single SSID. Likewise, clients associated with the same VLAN may be connected through different SSIDs. As such, there is no limitation that a column of the SSID/VLAN occupancy table contain a single 'YES' value nor is there a limitation that a single row of the table contain only a single 'YES' value.

The medium 220 may also include instructions for maintaining client/SSID/VLAN mapping 224. The client/SSID/VLAN mapping 226 may be stored in the medium as well. One example of the mapping information has already been described with respect to the SSID/VLAN occupancy table 230. Another table that may be maintained is an administrator configured SSID to VLAN mapping table 232. In some example implementations, a client may be assigned to a VLAN based on the SSID on which the client connects. For example, a wireless access point administrator using the admin interface 216 may establish a hard coded mapping of SSIDs to VLANs. The processor 214 may execute the instructions 224 for maintaining the client/SSID/VLAN mapping 224 to receive the hard coded mapping and store the information in the client/SSID/VLAN mapping 226.

For example, an administrator may establish a SSID to VLAN mapping as shown in SSID to VLAN mapping table 232. As shown, SSID letter E is associated with VLAN number 2, while SSID letter G is associated with VLAN number 3. A client that connects to a particular SSID may be associated with the corresponding VLAN and the SSID/VLAN occupancy table updated accordingly. A client connecting to a wireless access point will be described in further detail below.

In other example implementations, there may not be a hard coded mapping of SSID to VLAN. Rather, when a client attempts to connect to a wireless access point, the client may provide authentication information which identifies the client. The wireless access point may attempt to authenticate the client with an authentication system. The authentication system may include in its response an indication of the VLAN that the client should be associated with. In yet further example implementations, a combination of hard coded SSID to VLAN mapping and authentication system determination of associated VLAN may be used. For example, if there is no entry in the SSID to VLAN mapping table 232, the authentication system may be used. As another example, if the authentication system is used to obtain an associated VLAN, the SSID to VLAN mapping table may be ignored. What should be understood is that both methods are not mutually exclusive within a wireless access point and may be used simultaneously.

A client may attempt to connect to a wireless access point using one of the SSIDs provided by the wireless access point. When such an attempt is made, the instructions for maintaining client/SSID/VLAN mapping 224 may create an entry in a clients table 234. Each entry in the client table may identify properties of the client, including the client's Medium Access Control (MAC) address. The MAC address may be used to identify an individual client. In addition to the MAC, the wireless access point may also store the SSID on which the client is attempting to connect. Furthermore, the wireless access point may store the VLAN that should be associated with the client. As explained above, the VLAN may be determined either through mappings or through an authentication request. Regardless of the mechanism used, the wireless access point may store the associated VLAN in the client table 234.

For example, as shown in clients table 234, a client 00:00:00:00:00:140 may have attempted to connect to SSID letter E of the wireless access point. The wireless access point may have examined the SSID to VLAN mapping table 232 and determined that clients connected to SSID letter E should be assigned to VLAN number 2. As such, the entry in the clients table 234 indicates the client 00:00:00:00:00:140 is associated with VLAN number 2. As another example, client 00:00:00:00:00:150 may have attempted to connect to SSID letter F. As there is no entry for SSID letter F in the table 232, the wireless access point may have authenticated the client using an authentication system. The response from the authentication system may have indicated that the client 00:00:00:00:00:150 should be associated with VLAN number 3. As such, the entry in the clients table reflects this association. In other example implementations, the SSID to VLAN mapping table 232 may not be examined at all. In those example implementations the client to VLAN association may be received from the authentication system.

In addition to maintaining the clients table 234 to reflect which clients are connected to which SSIDs and associated with which VLANS, the clients table 234 may also be used by the wireless access point to maintain the SSID/VLAN occupancy table 230. When a new client is associated with the wireless access point, the wireless access point may update/verify the value in the occupancy table to indicate that the combination of SSID and VLAN is occupied by at least one client. For example, if a new client were to connect to SSID letter G, the SSID to VLAN mapping table 232 would indicate the client should be associated with VLAN number 3. The wireless access point may then update the SSID/VLAN occupancy table 230 to reflect that at least one client has occupied the combination of SSID letter G and VLAN number 3. As additional clients connect to the same SSID and VLAN, the table need not be updated, as there would be no change in occupancy as long as at least one client remains connected.

In addition, when a client disassociates from the wireless access point, the clients table 234 may be updated to remove the client. Furthermore, the SSID/VLAN occupancy table 230 may also be updated based on the disassociation. For example, if the disassociating client was the only client occupying the SSID/VLAN combination, the entry may be updated to reflect that the combination is no longer occupied once the client disassociates. For example, if client 00:00:00:00:00:140 were to disassociate from the wireless access point, its entry in the clients table may be removed. As such, there would no longer be any clients in the table associated with SSID letter E and VLAN number 2. As such, the SSID letter E/VLAN number 2 combination in the SSID/VLAN occupancy table 230 would be updated to reflect that no client is occupying the combination. Use of the SSID/VLAN occupancy table 230 will be described in further detail below.

Figure 3:
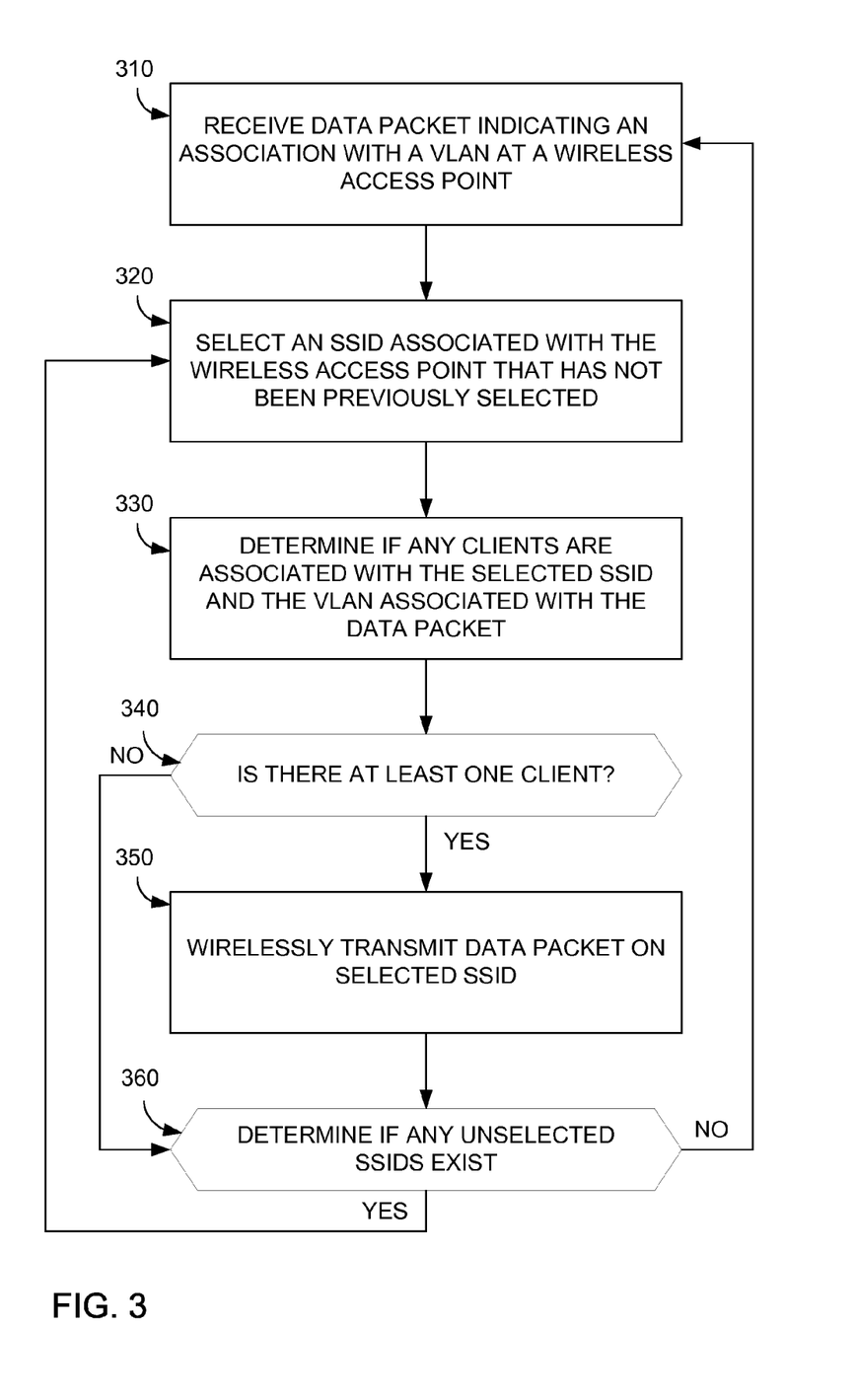
FIG. 3 depicts an example of a high level flow diagram for wirelessly transmitting data packets.

FIG. 3 depicts an example of a high level flow diagram for wirelessly transmitting data packets. In block 310, the wireless access point may receive a data packet which indicates association with a VLAN. In block 320, an SSID that is associated with the wireless access point that has not been previously selected may be selected. In other words, the wireless access point may begin to loop through each SSID that is associated with the wireless access point.

In block 330, it may be determined if any clients are associated with the selected SSID and the VLAN associated with the data packet. In other words, the wireless access point may determine if, for the selected SSID, there is at least one client associated with the same VLAN that may be contained in the data packet. For example, the wireless access point may use the intersection of the selected SSID and the VLAN contained in the data packet to examine the contents of the SSID/VLAN occupancy table 230. If a YES value is found, this means that there may be at least one client associated with the SSID and the VLAN.

In block 340, if it is determined that there is not at least one client associated with the SSID and the VLAN, the process moves to block 360, which will be described below. If there is at least one client, the process moves to block 350. In block 350, the data packet may be wirelessly transmitted on the selected SSID. In block 360, it is determined if any unselected SSIDs exist. If so, the process moves back to block 320 and a new SSID is selected. In general, the wireless access point may loop through all assigned SSIDs and determine if the SSID is occupied by at least one client associated with the VLAN contained in the data packet. If there are no remaining unselected SSIDs, the process may return to block 310 to await the arrival of the next data packet.

Figure 4:
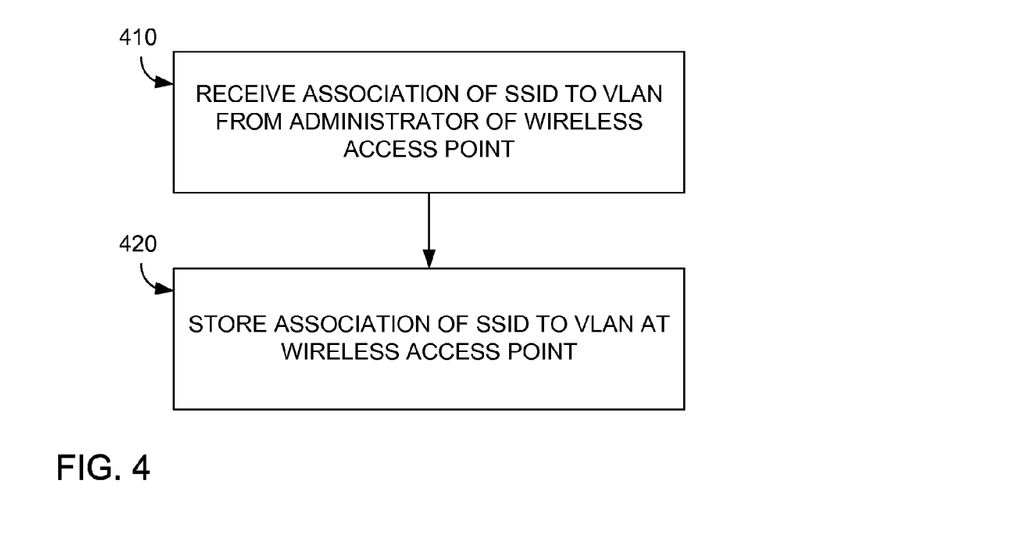
FIG. 4 depicts an example of a high level flow diagram for mapping SSIDs to VLANs.

FIG. 4 depicts an example of a high level flow diagram for mapping SSIDs to VLANs. In block 410 the wireless access point may receive an association of SSIDs to VLANs from an administrator of the wireless access point. In block 420, the wireless access point may store the association of SSIDs to VLANs in the wireless access point. For example, the process shown in FIG. 4 may be an example implementation of how SSID to VLAN mapping table 232 may be populated.

Figure 5:
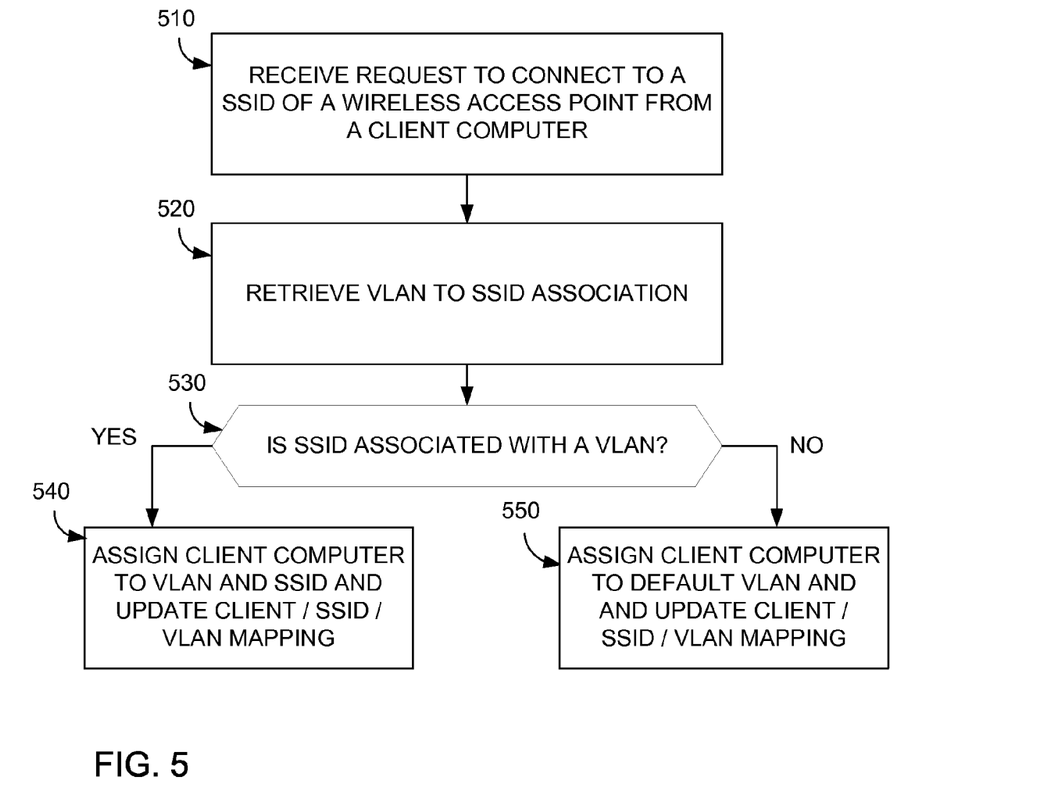
FIG. 5 depicts an example of a high level flow diagram of a client associating with a wireless access point.

FIG. 5 depicts an example of a high level flow diagram of a client associating with a wireless access point. In block 510 a request to connect to an SSID of a wireless access point may be received from a client computer. In block 520, a VLAN to SSID association may be retrieved. For example, the association may be retrieved from a SSID to VLAN mapping table 232 as was described with reference to FIG. 2. In block 530 it may be determined if the SSID is associated with a VLAN.

If the SSID is associated with a VLAN the process moves to block 540. In block 540, the client computer may be associated with the VLAN and SSID. For example, the clients table 234 may be updated to indicate the client is associated with the wireless access point, the SSID, and the determined VLAN. In addition, the client/SSID/VLAN mapping may be updated to indicate that there is at least one client associated with the combination of the SSID and VLAN. For example, the SSID/VLAN occupancy table 230 may be updated to reflect that at least one client is associated with the combination of SSID and VLAN.

If no VLAN is associated with the SSID, the process moves to block 550. In some example implementations, the client computer may be associated with a default VLAN. The client/SSID/VLAN mapping may also be updated to reflect the association. In other example implementations, rather than associating the client with a default VLAN, an authentication system may be used to determine the appropriate VLAN. Use of an authentication system will be described in further detail with respect to FIG. 6.

Figure 6:
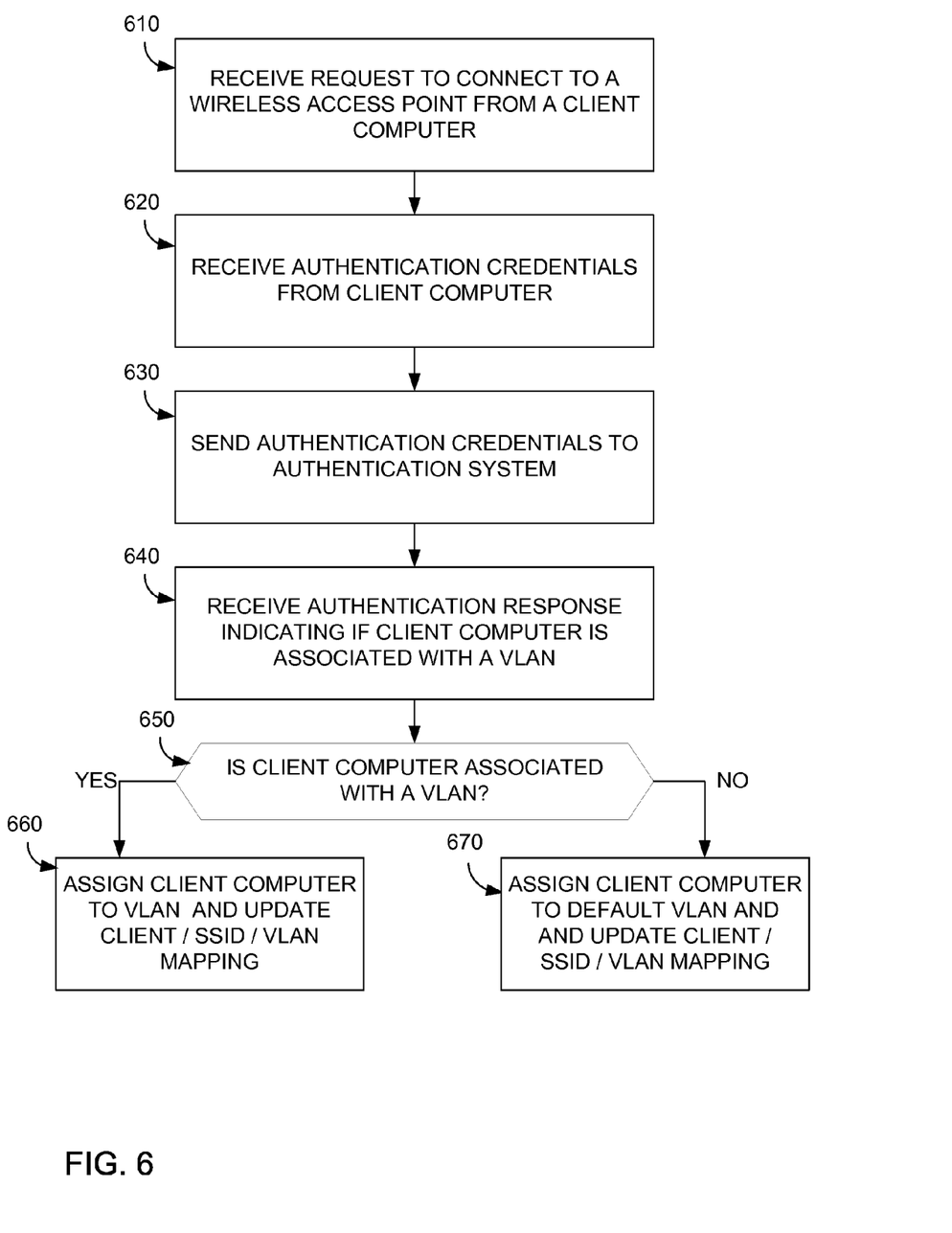
FIG. 6 depicts another example of a high level flow diagram of a client associating with a wireless access point.

FIG. 6 depicts another example of a high level flow diagram of a client associating with a wireless access point. In block 610 a request to connect to a wireless access point may be received from a client computer. In block 620, the wireless access point may receive authentication credentials from the client computer. In block 630 the authentication credentials may be sent to an authentication system. In block 640 an authentication response may be received that indicates if the client computer is associated with a VLAN.

In block 650, if the authentication response indicates the client should be associated with a VLAN, the process moves to block 660. In block 660 the client computer may be assigned to a VLAN. In addition, the client/SSID/VLAN mapping may be updated to indicate a client is associated with the combination of an SSID and VLAN. For example, the SSID/VLAN occupancy table 230 may be updated as described above.

If the authentication response does not indicate a VLAN in block 650, the process moves to block 670. In block 670, the client computer may be assigned to a default VLAN. The client/SSID/VLAN mapping table may be updated accordingly. In some example implementations, if the authentication response does not indicate an association with a VLAN, the method described with respect to FIG. 5 may be used to associate the client with a VLAN.

Figure 7:
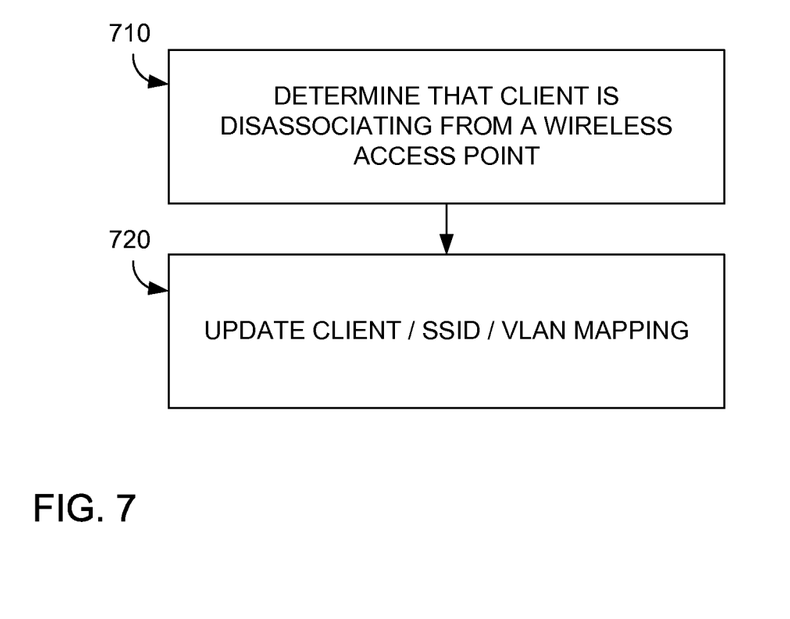
FIG. 7 depicts an example of a high level flow diagram of a client disassociating with a wireless access point.

FIG. 7 depicts an example of a high level flow diagram of a client disassociating with a wireless access point. In block 710, it may be determined that a client is disassociating from a wireless access point. For example, the client may send an explicit disassociation request. However, it is also possible that the client may abruptly disassociate. For example, if power is removed from the client, there may be no time for the client to send an orderly disassociation request. However, wireless access points may typically keep track of if a client is no longer present by periodically querying the client to determine if it is still connected. Regardless of how it is determined that the client is disassociating, the wireless access point is made aware that the client is no longer available.

In block 720, the client/SSID/VLAN mapping may be updated. For example, the client may be removed from the clients table 234. In addition, the SSID/VLAN occupancy table 230 may be updated to reflect the disassociation of the client. For example, if the client is the only client that was occupying a combination of an SSID and VLAN, the occupancy table may be updated to reflect that the combination is no longer occupied. However, if there is another client that is also occupying the combination of SSID and VLAN, the occupancy table may not be updated, as there is still a client remaining that should receive data packets.

I claim:

1. A method comprising:
  receiving a data packet indicating an association with a particular Virtual Local Area Network (VLAN) at a wireless access point;
  identifying, using an occupancy table that comprises values indicating whether or not at least one client is associated with a respective SSID and with a respective VLAN of each SSID/VLAN combination in a plurality of SSIDs and a plurality of VLANs, at least two SSIDs having clients that are associated with the particular VLAN, the at least two SSIDs comprising a first SSID and a second SSID, wherein the clients comprise:
    a first client that is associated with the particular VLAN and with the first SSID, and
    a second client h t is associated with the particular VLAN and with the second SSID; and
  transmitting the data packet from the wireless access point from each of the at least two SSIDs having at least one client associated with the particular VLAN.

2. The method of claim 1 wherein the identifying SSIDs includes:

a) in response to said receiving, selecting a SSI D associated with the wireless access point that has not been previously selected in response to said receiving;
b) determining if at least one client is associated with the selected SSD and the VLAN associated with the data packet;
c) transmitting the data packet on the selected SSID if there is at least one client associated with the VLAN and the wireless access point:
d) whether or not there is a client associated with the selected SSID and the VLAN associated with the data packet. determining if there is an unselected SSID; and
e) if there is an unselected SSID, repeating actions a-d.

3. The method of claim 2 wherein the identifying further includes:
if, at action b, no client is associated with the selected SSID, then not transmitting the data packet on the selected SSID; and
performing action d.

4. A computer product comprising a non-transitory processor readable medium encoded with a set of instructions, which if executed by a processor, cause the processor to perform a method including:
in response to receiving a data packet indicating an association with a particular Virtual Local Area Network (VLAN) at a wireless access point, identifying, using an occupancy table that comprises values indicating whether or not at least one client is associated with a respective SSID and with a respective VLAN of each SSID/VLAN combination in a plurality of SSIDs and a plurality of VLANs, at least two SSIDs having clients that are associated with the particular VLAN, the at least two SSIDs comprising a first SSID and a second SSID, wherein the clients comprise:
a first client hat is associated with the particular VLAN and with the first SSID, and
a second client that is associated with the particular VLAN and with the second SSID; and
transmitting the data packet from the wireless access point from each of the at least two SSIDs having at least one client associated with the particular VLAN.

5. The computer product of claim 4 wherein:
a) the identifying includes in response to said receiving, selecting SSID associated with the wireless access point that has not been previously selected in response to said receiving;
b) the identifying further includes determining if at least one client is associated with the selected SSID and the VLAN associated with the data packet;
c) the transmitting further includes transmitting the data packet on the selected SSID if there is at least one client associated with the particular VLAN and the wireless access point;
d) whether or not there is a client associated with the selected SSID and the VLAN associated with the data packet, determining if there is an unselected SSID; and
e) if there is an unselected SSID, repeating actions a-d.

6. The computer product of claim 5 wherein the identifying further includes:
if, at action b, no client is associated with the selected SSID, then not transmitting the data packet on the selected SSID; and
performing action d.

7. The computer product of claim 5 wherein action b includes accessing the occupancy table for multiple SSIDs and multiple VLANS.

8. A method comprising:
maintaining, in a table stored at a wireless access point, a mapping of clients to VLANs and SSIDs, wherein the clients comprise:
a first client that is associated with a first VLAN and with a first SSID, and
a second client that is associated with the first VLAN and with a second SSID; and
maintaining, for each combination of SSID and VLAN, an indication whether or not at least one client is associated with the combination of the SSID and the VLAN, 9. The method of claim 8 further comprising:
receiving a data packet associated with a VLAN;
for each SSID, determining if the combination of the VLAN and the SSID indicates at least one client is associated with the combination; and
wirelessly transmitting the data packet on each SSID determined to have at least one client associated with the combination.

10. The method of claim 9 further comprising:
maintaining a mapping of SSIDs to VLANs;
receiving a request from a client to associate with the wireless access point, the request identifying a SSID:
associating the client with the identified SSID; and
updating the indication of the combined identified SSID and mapped VLAN to indicate at least one client is associated with the combination.

11. The method of claim 9 further comprising:
receiving a request from a client to associate with the wireless access point, the request including authentication credentials, the request identifying a SSID;
requesting authentication of the client using the authentication credentials;
receiving an authentication response, the authentication response identifying a VLAN to which the client should be associated;
associating the client with the identified SSID and VLAN; and
updating the indication of the combined identified SSID and VLAN to indicate at least one client is associated with the combination.

12. The method of claim 9 further comprising:
updating the indication of the combined SSID and VLAN to indicate no client is associated with the combination when a last client associated with the combination disassociates from the wireless access point.

* * * * *

UNITED STATES PATENT AND TRADEMARK OFFICE
CERTIFICATE OF CORRECTION

PATENT NO.       : 9,148,781 B2
APPLICATION NO.  : 13/192681
DATED            : September 29, 2015
INVENTOR(S)      : Jocelyn Le Sage Page 1 of 1

It is certified that error appears in the above-identified patent and that said Letters Patent is hereby corrected as shown below:

In The Claims

In column 8, line 61, in Claim 1, delete "h t" and insert -- that --, therefor.

In column 9, line 1, in Claim 2, delete "SSI D" and insert -- SSID --, therefor.

In column 9, line 5, in Claim 2, delete "SSD" and insert -- SSID --, therefor.

In column 9, line 9, in Claim 2, delete "point:" and insert -- point; --, therefor.

In column 9, line 12, in Claim 2, delete "packet." and insert -- packet, --, therefor.

In column 9, line 35, in Claim 4, delete "hat" and insert -- that --, therefor.

In column 9, line 44 approx., in Claim 5, delete "selecting" and insert -- selecting a --, therefor.

In column 10, line 21, in Claim 8, delete "VLAN," and insert -- VLAN. --, therefor.

In column 10, line 33 approx., in Claim 10, delete "SSID:" and insert -- SSID; --, therefor.

Signed and Sealed this
Fifteenth Day of March, 2016

Michelle K. Lee
*Director of the United States Patent and Trademark Office*